US012011625B2

(12) United States Patent
Neynavaee et al.

(10) Patent No.: US 12,011,625 B2
(45) Date of Patent: Jun. 18, 2024

(54) FIRE EXTINGUISHING CAPSULE

(71) Applicants: Houtan Neynavaee, Bellevue, WA (US); Karo Solat, Redmond, WA (US); Arash Rahgozar, San Jose, CA (US)

(72) Inventors: Houtan Neynavaee, Bellevue, WA (US); Karo Solat, Redmond, WA (US); Arash Rahgozar, San Jose, CA (US)

( * ) Notice: Subject to any disclaimer, the term of this patent is extended or adjusted under 35 U.S.C. 154(b) by 536 days.

(21) Appl. No.: 17/219,838

(22) Filed: Mar. 31, 2021

(65) Prior Publication Data

US 2021/0308504 A1 Oct. 7, 2021

Related U.S. Application Data

(60) Provisional application No. 63/002,684, filed on Mar. 31, 2020.

(51) Int. Cl.
*A62C 3/02* (2006.01)

(52) U.S. Cl.
CPC .................................... *A62C 3/025* (2013.01)

(58) Field of Classification Search
CPC ........ A62C 3/025; B65D 25/16; B65D 25/18; B65D 7/12; B65D 90/028
USPC ....... 220/495.01, 62.21, 682, 683, 692, 693, 220/601, 615, 560.09, 560.1, 4.06, 4.07; 169/36
See application file for complete search history.

(56) References Cited

U.S. PATENT DOCUMENTS 4,344,489 A * 8/1982 Bonaparte ............ A62C 3/0235 169/70
5,590,717 A * 1/1997 McBay .................. A62C 35/10 169/69
7,261,165 B1 * 8/2007 Black ...................... F42B 12/50 169/29
2008/0289832 A1 * 11/2008 Schimpf ................ A62C 35/08 169/51

* cited by examiner

*Primary Examiner* — Joseph A Greenlund
*Assistant Examiner* — Juan C Barrera
(74) *Attorney, Agent, or Firm* — The Rapacke Law Group, P.A.; Andrew S. Rapacke

(57) ABSTRACT

A sealable capsule configured to contain one or more fire extinguishing materials is provided. The sealable capsule can include an upper and a lower shell, an internal bladder and a mechanism for releasing the fire extinguishing materials. The upper shell can include a valve, one or more through-holes filled and sealed with a corresponding number of plugs, and one or more rods, each extending from the plug to an internal plate of the releasing mechanism. The upper shell can be configured to contain a first fire extinguishing material, and the lower shell can include a membrane configured to contain a second fire-extinguishing material. The bladder can be coupled to the internal plate and to the upper and lower shells, such that the bladder is positioned within the capsule in a first position when the capsule is prepared for use and in a second position when the capsule has been activated.

13 Claims, 5 Drawing Sheets

FIRE EXTINGUISHING CAPSULE

CROSS-REFERENCE TO RELATED APPLICATIONS

This application claims the benefit of priority under 35 U.S.C. § 119(e) of U.S. Provisional Application Ser. No. 63/002,684 filed on Mar. 31, 2020, the content of which is relied upon and incorporated herein by reference in its entirety.

FIELD

The present disclosure relates to a capsule; and, more specifically, to a fire extinguishing capsule that can be filled with components that, when dropped from a higher altitude (e.g., airplane) into a wildfire, will assist in extinguishing and suppressing the fire.

BACKGROUND

Wildfires cause significant environmental damage, and both the frequency and intensity of wildfires continues to increase. Existing systems for extinguishing wildfires create an additional risk to the lives of firefighters or volunteers who near a wildfire. And responding to a fire during the night provides additional challenges. Thus, improved fire extinguishing devices and methods that are safely and efficiently operable during the day or night are needed.

SUMMARY

In various embodiments, a sealable capsule configured to contain one or more fire extinguishing materials is provided. The sealable capsule can include an upper and a lower shell, an internal bladder and a mechanism for releasing the fire extinguishing materials. The upper shell can include a valve, one or more through-holes filled and sealed with a corresponding number of plugs, and one or more rods, each extending from the plug to an internal plate of the releasing mechanism. The upper shell can be configured to contain a first fire extinguishing material, and the lower shell can include a membrane configured to contain a second fire-extinguishing material. The bladder can be coupled to the internal plate and to the upper and lower shells, such that the bladder is positioned within the capsule in a first position when the capsule is prepared for use and in a second position when the capsule has been activated.

In some embodiments, the upper shell can include a circular cross-sectional shape, a hemispherical portion where the one or more through-holes are positioned, a cylindrical portion that is in contact with the hemispherical portion on a first edge. The upper shell can include a rim projecting laterally from a second edge of the cylindrical portion.

In some embodiments, the sealable capsule can include a washer having an inner edge in contact with the bladder. The washer can include a first surface and a second surface at a first spaced distance from the first surface, such that the first spaced distance defines a thickness of the washer, and the first surface can be in contact with a lower surface of the rim.

In some embodiments, the washer is configured to retain the bladder in the first position when the sealable capsule is prepared for use and to release the bladder to the second position when the capsule has been activated. In such embodiments, the first and second positions are defined relative to a longitudinal axis extending through the sealed capsule.

In some embodiments, the lower shell membrane can include a pocket configured to receive the rim of the upper shell and a first portion of the washer; and the bladder can include a groove configured to receive a second portion of the washer that is not received in the pocket. In such embodiments, the second portion of the washer can be forced out of the bladder groove to release the bladder when the capsule has been activated.

In some embodiments, the upper shell can comprise a plurality of layers, including an outer layer having an external facing surface and an inner layer having an internal facing surface; and the one or more through-holes passes through each of the inner and outer layers.

The foregoing general summary is intended to provide an overview or framework for understanding the nature and character of the embodiments disclosed herein. This summary is not intended to identify essential inventive concepts of the claimed subject matter or limit the scope of the claimed subject matter. Additional features and advantages of the embodiments disclosed herein will be set forth in the detailed description that follows, and in part will be clear to those skilled in the art from that description or recognized by practicing the embodiments described herein, including the detailed description that follows, the claims, and the appended drawings.

BRIEF DESCRIPTION OF THE DRAWINGS

A complete understanding of the present embodiments and the advantages and features thereof will be more readily understood by reference to the following detailed description, appended claims, and accompanying drawings, wherein:

Figure 1:
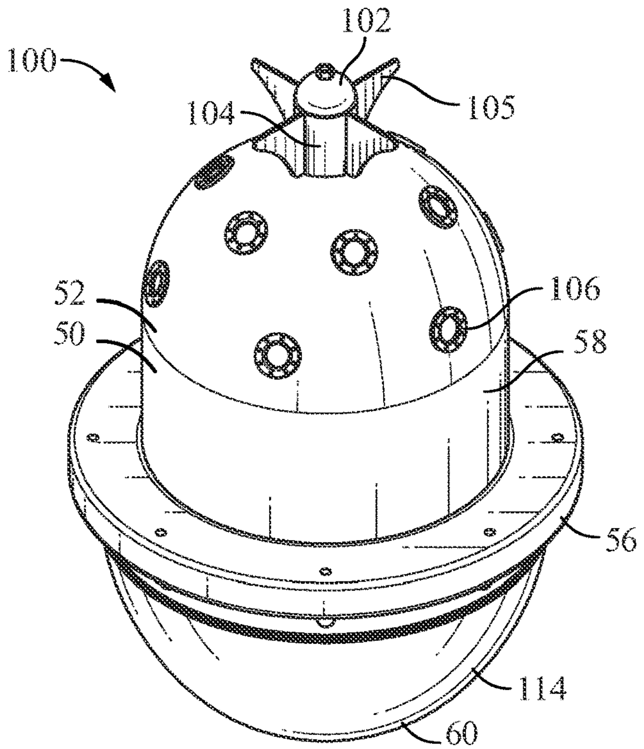
FIG. 1 shows a perspective view of a fire extinguishing capsule, according to embodiments described herein.

The drawings are not necessarily to scale, and certain features and certain views of the drawings may be shown exaggerated in scale or in schematic in the interest of clarity and conciseness.

DETAILED DESCRIPTION

Reference will now be made in detail to the exemplary embodiment(s), examples of which is/are illustrated in the accompanying drawings. Whenever possible, the same reference numerals will be used throughout the drawings to refer to the same or like parts.

Before describing the exemplary embodiments, it is noted the embodiments reside primarily in combinations of components and procedures related to the apparatus. Accordingly, the apparatus components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

The specific details of the various embodiments described herein are used for demonstration purposes only, and no unnecessary limitation or inferences are to be understood therefrom. Furthermore, as used herein, relational terms, such as "first" and "second," "top" and "bottom," and the like, may be used solely to distinguish one entity or element from another entity or element without necessarily requiring or implying any physical or logical relationship, or order between such entities or elements.

In various embodiments, as shown in FIGS. 1-6E, a fire extinguishing capsule is provided. The fire extinguishing capsule is configured to release fire extinguishing materials when deployed and activated. In some embodiments, the fire extinguishing capsule is activated by an impact force. For example, the fire extinguishing capsule is suitable for an aerial delivery to a fire (e.g., dropped from aircraft). In some embodiments, upon impact with the ground, the fire extinguishing capsule is configured to release one or more fire extinguishing materials contained therein to extinguish a fire and/or suppress a fire. In some embodiments, the fire extinguishing capsule and/or several components thereof are reusable after a deployment and activation (e.g., by impact) of the fire extinguishing capsule.

In some embodiments, as shown in FIGS. 1-5, the fire extinguishing capsule 100 is a closed (i.e., sealed) receptacle, the receptacle being closed by coupling the upper shell 50 and the lower shell 60. As a closed receptacle, the fire extinguishing capsule 100 is capable of containing gases or liquids. In some embodiments, the fire extinguishing capsule 100 is capable of containing, separately and independently, one or more gases and/or one or more liquids. In general, the volume of the gases and/or liquids that can be contained inside of the fire extinguishing capsule 100 is defined by the overall size of the closed receptable, as well as the size of any independently enclosed areas inside of the capsule. One or more independently enclosed areas inside of the capsule (compartments) for containing a volume of gas and/or liquid is defined by the structure and relation of certain internal components of the closed receptacle. For example, the fire extinguishing capsule 100 shown in FIG. 4 includes a first compartment 202 having a first volume, a second compartment 204 having a second volume, and a third compartment 206 having a third volume. The first, second, and third volumes may be the same or different.

In some embodiments, the upper shell 50 has a bell shape with an outer rim 56 extending circumferentially around a lower edge of the shell. In some embodiments, the rim 56 projects outward from the upper shell 50. In some embodiments, the rim 56 projects in a transverse direction relative a longitudinal axis defined by the upper shell 50. In some embodiments, the rim 56 projects perpendicularly from the lower edge of the upper shell 50.

In some embodiments, the upper shell 50 comprises a first section 52 and a second section 58. The first section 52 can be any suitable size and shape. In some embodiments, for example, the first section 52 has a hemispherical dome shape. The second section 58 can have any suitable size and shape. In such embodiments, for example, the second section 58 has a cylindrical, tubular shape that is in contact with the first section 52 on an upper (first) edge and in contact the rim 56 on a lower (second) edge. In such embodiments, the rim 56 extends circumferentially around the lower edge of the second section 58. In some embodiments, a combination of the hemispherical shape the first section 52, the cylindrical shape of the second section 58, and the projecting rim 56 define the shape of the upper shell 50.

In some embodiments, the upper shell 50 comprises one or more layers. In some embodiments, the upper shell 50 comprises a single layer. In such embodiments, the single layer can be a metal or metal alloy having sufficient properties, including, e.g., chemical resistance and non-reactivity (e.g., chemically inert) to any fire extinguishing materials contained within the fire extinguishing capsule 100, resistance to external weather and environmental conditions, and resilience for substantially retaining the original shape before, during, and after use (i.e., deployment into a fire). In some embodiments, the metal alloy is stainless steel. Other metals and alloys are contemplated.

In some embodiments, the upper shell 50 comprises a plurality of layers. In such embodiments, the upper shell 50 comprises first layer 53 having an outer surface exposed to the environment, a second layer 59 having an inner surface exposed to the fire extinguishing materials contained within the fire extinguishing capsule 100, and an insulating layer 68 disposed between the first and second layers 53, 59. In such embodiments, the first and second layers 53, 59 comprise a metal or metal alloy having sufficient properties, including, e.g., chemical resistance and non-reactivity (e.g., chemically inert) to any fire extinguishing materials contained within the fire extinguishing capsule 100, resistance to external weather and environmental conditions, and resilience for substantially retaining the original shape before, during, and after use (i.e., deployment into a fire). In some embodiments, the metal alloy is stainless steel. Other metals and alloys are contemplated.

Figure 5:
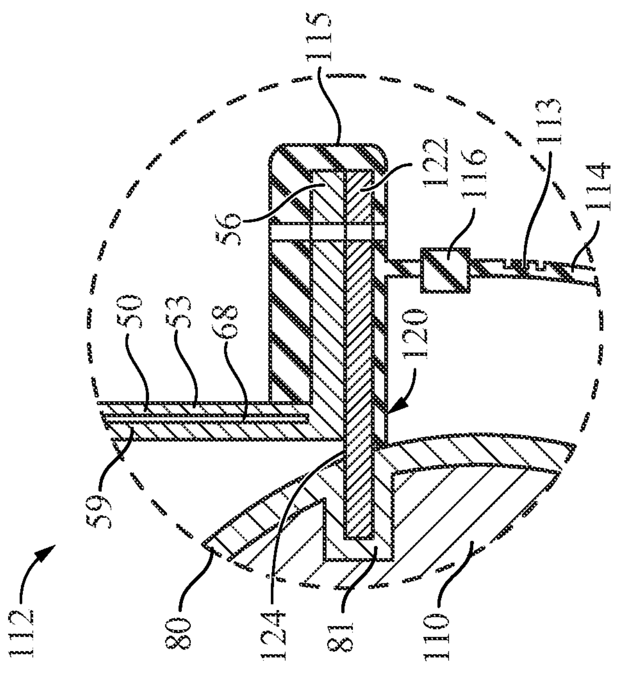
FIG. 5 shows a zoomed in view of certain components in the fire extinguishing capsule in FIG. 4.
Figure 4:
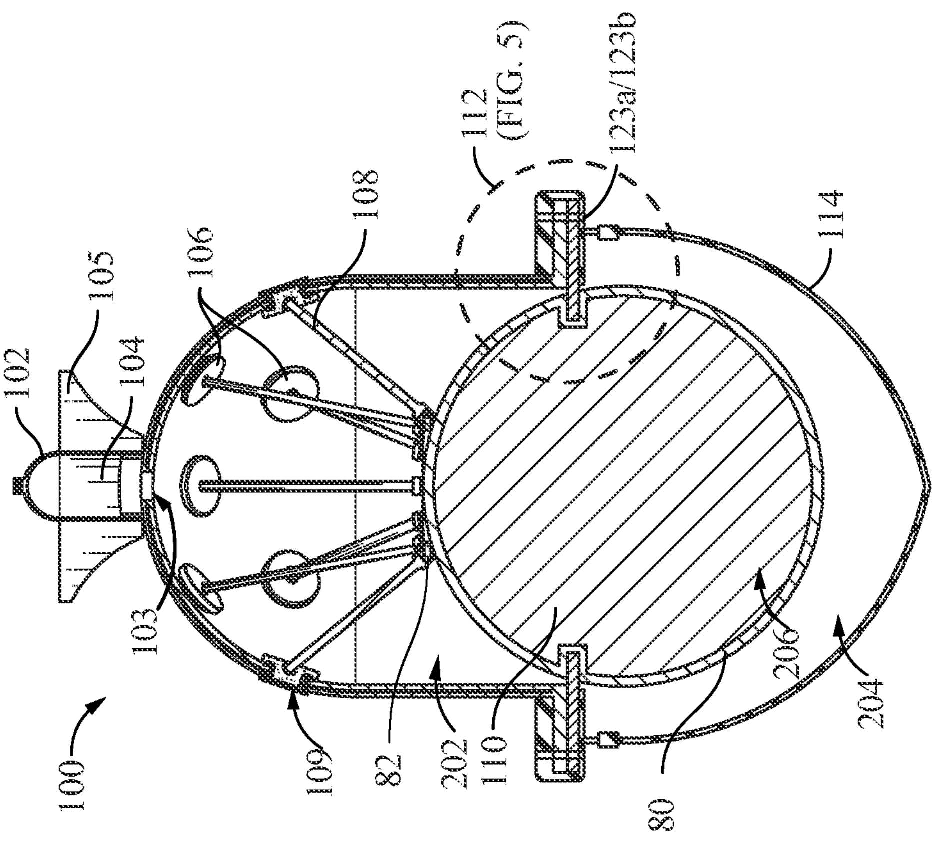
FIG. 4 shows a sectional view of the fire extinguishing capsule in FIG. 2.

As shown in FIGS. 4 and 5, in some embodiments, the insulating layer 68 resides between the first and second layers 53, 59. The insulating layer can comprise any suitable material(s). In some embodiments, for example, the insulating layer 68 comprises air and/or an additional insulating material. During use, the insulating layer 68 is positioned within the upper shell 50 to insulate the external temperature (i.e., external to the fire extinguishing capsule 100) from the internal temperature (i.e., inside the fire extinguishing capsule 100) and to reduce any interfering effect the external and internal temperatures have on one another.

In some embodiments, as shown in FIGS. 1-4, the upper shell 50 comprises a valve 104 and a valve cap 102. In such embodiments, the upper shell 50 comprises a through-hole 103 configured to receive the valve 104. In some embodiments, the valve 104 is positioned at the zenith of the hemispherical structure, or the top center point of the upper shell 50. The valve 104 can be any suitable valve for filling and/or controlling the pressure within the fire extinguishing capsule 100, which means the valve can be used to fill the compartment 202 defined by the upper shell 50 with an appropriate volume of fire extinguishing material and prevent any leaks of the fire extinguishing material through the through-hole 103 during storage and/or transport. In other embodiments, the through-hole 103 and the corresponding valve 104 are positioned at a suitable location other than the top center point of the upper shell 50.

In some embodiments, the valve cap 102 is fastened to the upper shell 50 and the valve cap 102 is configured to surround and protect the valve 104. The valve cap 102 can be made out of any suitable material. In some embodiments, for example, the valve cap 102 comprises a metal or metal alloy (e.g., steel). In some embodiments, the valve cap 102 has one or more protruding flanges 105. In some embodiments, the valve cap 102 has two or four protruding flanges. In such embodiments, the valve cap 102 is sized and shape to assist with the aerodynamic fall or drop of the fire extinguishing capsule 100. For example, in some embodiments, the flanges are arranged equidistance from one another about a center axis, like a propellor. In some embodiments, the valve cap 102 has a threaded component configured to be screwed together with a threaded component of the through-hole 103. For example, in some embodiments, the valve cap 102 includes a threaded male component configured for a threaded female component (e.g., the through-hole 103). In such embodiments, the valve cap 102 covers and protects the valve 104 once it has been threaded into the through-hole 103.

In some embodiments, the valve cap 102 comprises a plurality of through-holes disposed along an upper region of the valve cap. In such embodiments, the cap holes are configured to reduce the danger in the event of a valve failure. In such embodiments, each of the cap holes is configured to force the fire extinguishing material from within the upper shell 50 to be released and to dissipate in small amounts without creating damage to the surrounding area.

In some embodiments, the valve cap 102 comprises a fastener 117 positioned on a top surface of the valve cap 102. In some embodiments, the fastener 117 is integrated into the valve cap 102 during manufacturing. In such embodiments, the fastener 117 is used to fasten the valve cap 102 to the upper shell 50. In some embodiments, the fastener 117 comprises a head that is sized and shaped for a fastening tool.

In some embodiments, the upper shell 50 comprises a plurality of plugs 106 and a plurality of through-holes 109 corresponding to the plurality of plugs (i.e., for each plug there is a corresponding through-hole). In some embodiments, the upper shell 50 further comprises a plurality of rods 108, wherein each rod 108 connects a plug 106 to the plate 82 (see FIG. 4). In some embodiments, the plate 82 is positioned transverse to the longitudinal axis of the capsule 100 and configured to receive and secure one or more rods to a surface thereof. In some embodiments, the plate 82 comprises a circumferential ring structure surrounding an aperture configured to accommodate the surface of or a portion of the bladder 80 therethrough. The plurality of through-holes 109 and the corresponding plurality of plugs 106 can be any suitable shape and size. In some embodiments, each rod 108 of the plurality of rods has a corresponding plug 106. In some embodiments, the first section 52 of the upper shell 50 comprises the valve cap 102, the plurality of plugs 106, and the plurality of through-holes 109.

Any suitable material can be used for the rods 108. In some embodiments, the rods 108 are made out of a metal or metal alloy, including for example, aluminum. Other metals or alloys are contemplated. During use, the rods may be damaged or break. Accordingly, the material selected for the rods 108 need not be cost-prohibitive.

Figure 2:
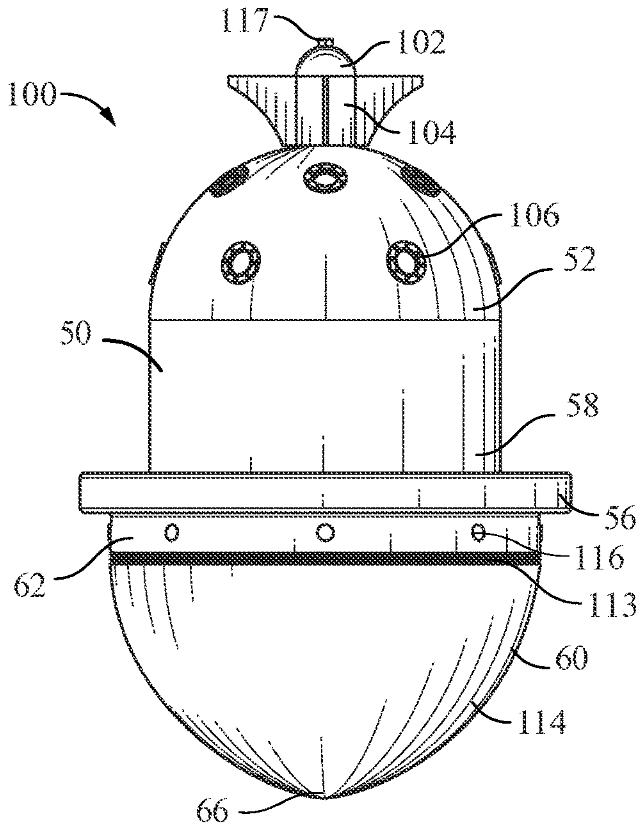
FIG. 2 shows a side view of the fire extinguishing capsule in FIG. 1.
Figure 3:
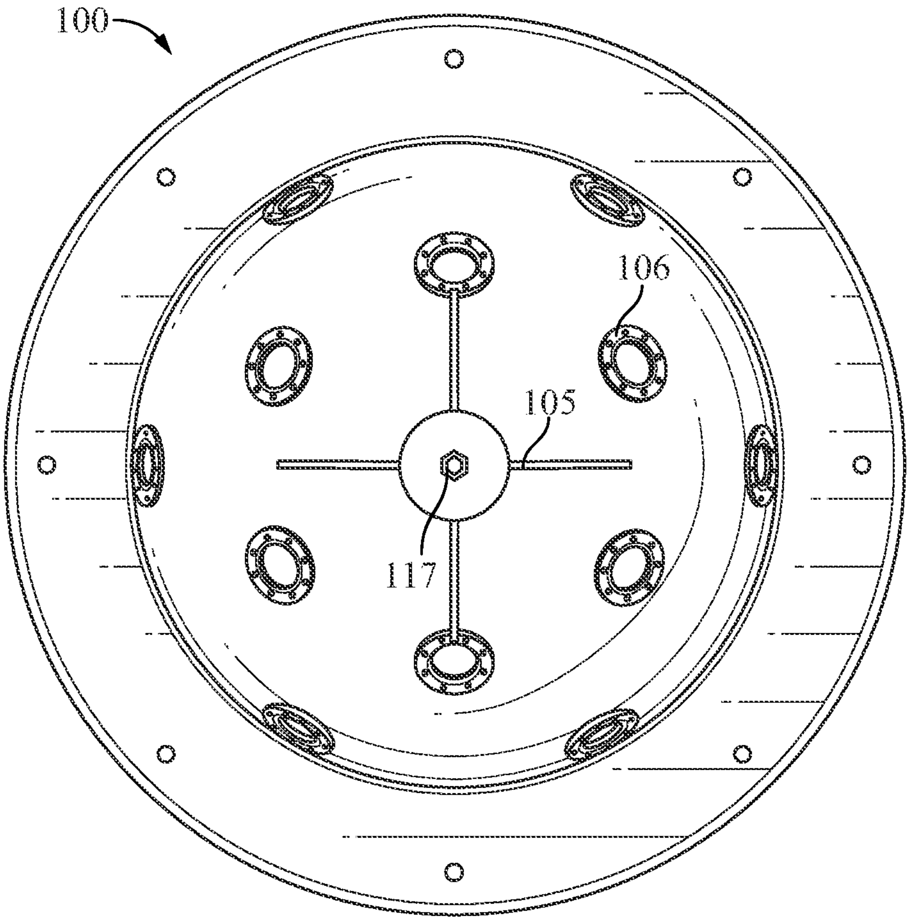
FIG. 3 shows a top view of the fire extinguishing capsule in FIG. 1.

In some embodiments, the plurality of through-holes 109 and the corresponding plurality of plugs 106 are positioned about the hemispherical structure, as shown in FIGS. 1-4. In some embodiments, the plurality of plugs 106 are positioned in a pattern. For example, in some embodiments, the first section 52 includes a plurality of rows and each row includes a plurality of plugs 106. As shown in FIG. 2, a first row of plugs is positioned proximate to the valve cap 102 (i.e., along an upper region of the dome-shaped first section 52) and a second row of plugs is positioned proximate to the upper edge of the second section 58 (i.e., along a lower region of the dome-shaped first section 52). In some embodiments, the position of plugs 106 on the first row is offset relative to the position of plugs 106 on the second row (i.e., offset with respect to a longitudinal axis of the capsule 100 passing through the fastener 117 and the bottom 66). In some embodiments, the plurality of plugs 106 are positioned about the hemispherical structure in various positions considered to be advantageous for dispersing the fire extinguishing materials releasably contained within the fire extinguishing capsule 100.

Certain features of the plugs 106 are illustrated further in FIGS. 6A-6E. As shown in the top and bottom views in FIGS. 6A and 6E, in some embodiments, the plug 106 comprises has a circular two-dimensional shape from the above- or below-perspective. In such embodiments, the plug 106 has a cylindrical hour-glass three-dimensional shape. Other shapes are contemplated, so long as the through-holes 109 have a suitable complementary shape.

In some embodiments, the plug 106 comprises a plurality of components, including a base 111 and a collar comprised of an inner collar 107 and an outer collar 119. In some embodiments, each of the inner collar 107 and the outer collar 119 have a threaded surface that can be used to join the components along the threaded seal 125. In some embodiments, the inner collar 107 is sized to fit within the outer collar 119 (i.e., the female outer collar 119 threadably receives the inner collar 107 during assembly of the collar). In such embodiments, base 111 comprises a portion that is pushed within an aperture of the inner collar 107 to form a tight seal. In some embodiments, the plug 106 comprises fasteners (e.g., pins) 127 that couple the inner collar 107 to the base 111. In some embodiments, one or more washers (e.g., flat, spring, fender, split lock, etc.) are included, such as washers 124*a* and/or 124*b*.

Figure 6A:
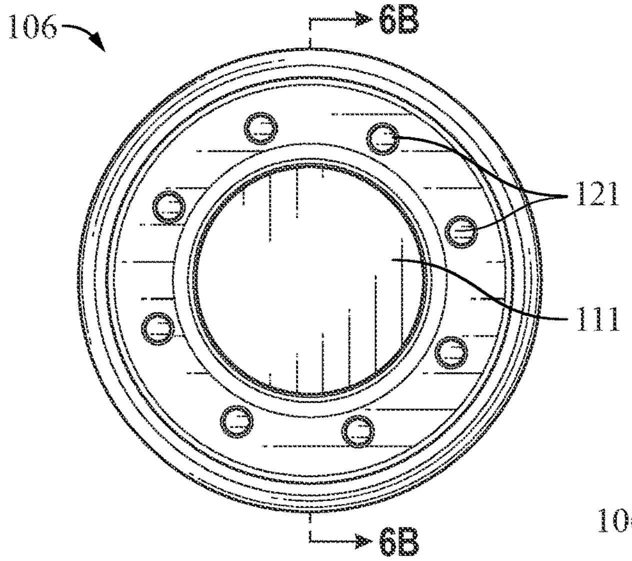
FIG. 6A shows a top view of a plug in the fire extinguishing capsule in FIG. 1.
Figure 6B:
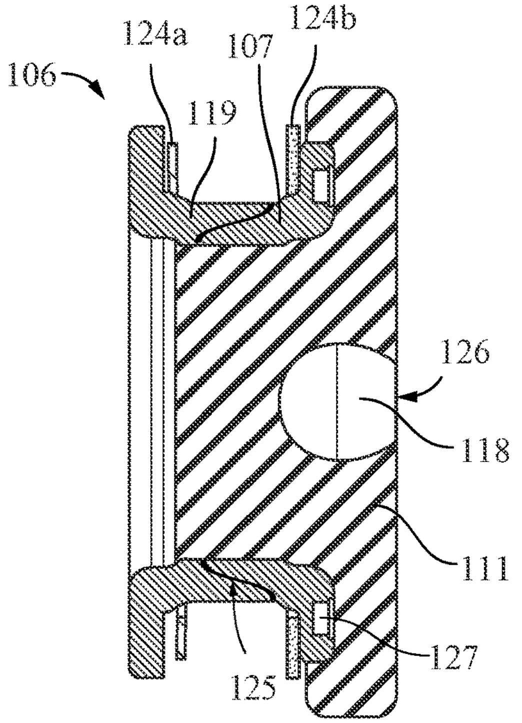
FIG. 6B shows a sectional view of the plug in FIG. 6A.
Figure 6C:
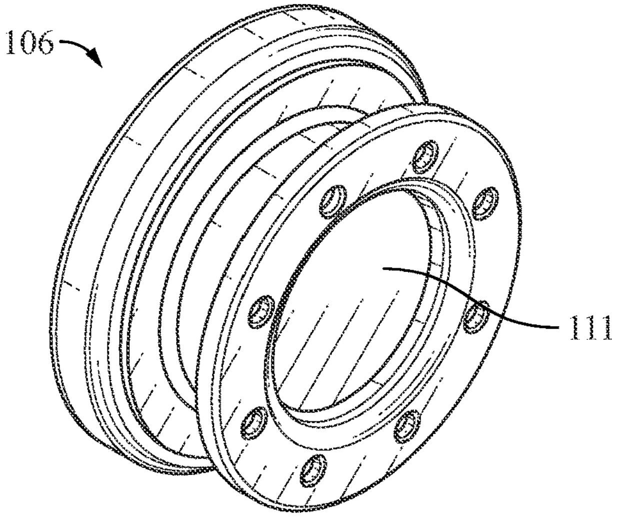
FIG. 6C shows a top perspective view of the plug in FIG. 6A.
Figure 6D:
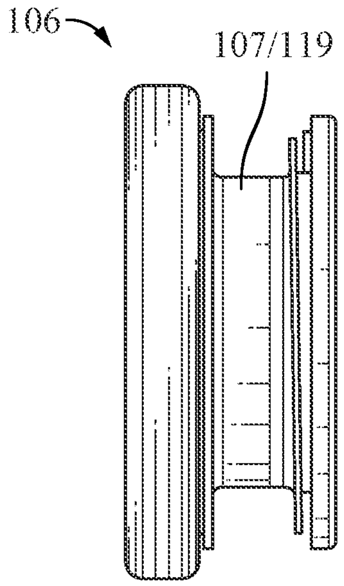
FIG. 6D shows a side view of the plug in FIG. 6A.
Figure 6E:
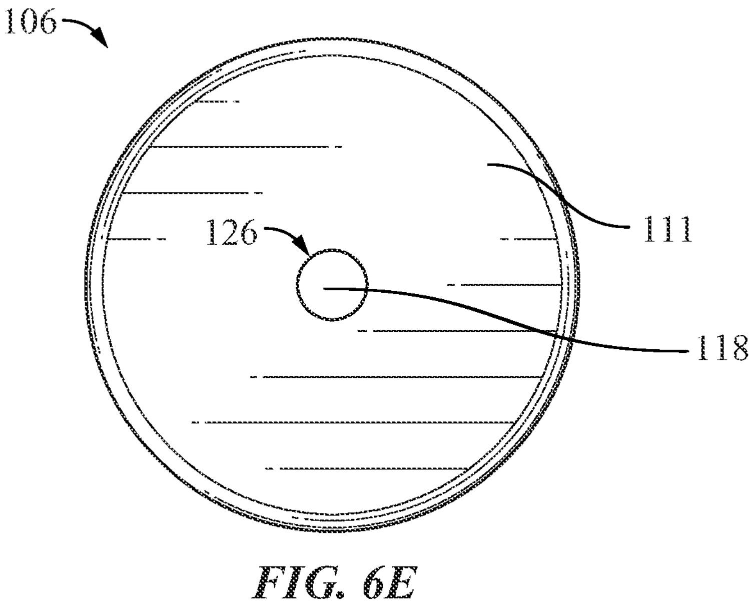
FIG. 6E shows a bottom view of the plug in FIG. 6A.

As shown in FIGS. 6B and 6E, in some embodiments, the base 111 comprises an opening 126 on a surface opposite the collar, and a cavity 118 within the opening that is configured to accommodate the head of the rod 108. In some embodiments, a first end of the rod 108 comprises a spherical head having a diameter that is larger than the diameter of the shaft of the rod and larger than the diameter of the opening 126, such when the spherical head is inserted through the opening 126 the spherical head will be secured in the cavity 118 such that the rod 108 is sufficiently coupled to the base 111. In some embodiments, the rod 108 comprises a second end opposite the end having a spherical head, that is coupled to the plate 82.

The plug 106, including the base 111 and collar 107/119 can be made out of any suitable material. In some embodiments, the base 111 is made out of a flexible rubber or plastic material suitable for assembly with the collar 107/119. In such embodiments, the material is compressible to fit within the aperture in the inner collar 107, and elastic enough to press back toward its non-compressed form in order to resist being removed. In some embodiments, the outer collar 119 includes one or more through-holes 121 to provide access for a tool used to couple the base 111 and collar 107/119 together.

In various embodiments, the fire extinguishing capsule 100 comprises the lower shell 60. The lower shell can include an upper portion 62 adjacent to the rim 56 and a bottom portion including the bottom surface 66. In some embodiments, the lower shell 60 is circumferentially coupled to the rim 56 of the upper shell 50. In some embodiments, the lower shell 60 comprises a membrane 114 and one or more removeable plugs 116. In some embodiments, the lower shell 60 comprises a plurality of plugs 116, the plugs being spaced apart from one another about the circumferential structure, as shown in FIGS. 2 and 5. In some embodiments, the membrane 114 functions as a container for fire extinguishing materials such as water or water-based deterrents. When water or another suitable liquid is stored in the compartment 204 defined by the membrane 114, the membrane 114 also functions as a shock absorber, and protects the payload 80 from contacting a surface (e.g., the ground or a rack).

The membrane 114 can be any suitable material. In some embodiments, the membrane 114 is a plastic or polymer having sufficient lack of porosity (to contain a liquid) and resiliency. In some embodiments, the material is sufficiently flexible and elastic to be worked or stretched when attaching the membrane 114 to the rim 56 of the upper shell 50. In some embodiments, as shown in FIGS. 2 and 5, the membrane 114 comprises one or more grooves 113 configured to split the membrane open upon the occurrence of a meaningful impact. In some embodiments, for example, the grooves 113 are circumferentially positioned around the membrane 114 in a position that is proximate to the plugs 116 and the area coupled to the upper shell 50. In some embodiments some grooves 113 are positioned at a further distance from the plugs 116 and the area coupled to the upper shell 50 (i.e., between the portion 62 and the bottom portion 66 of the lower shell 60).

Prior to deployment, one or more of the plugs 116 can be temporarily removed to expose one or more through-holes 109, which provide access to the compartment 204 for filling with a fire extinguishing material. After an appropriate or predetermined amount of material (e.g., water) has been added to the compartment 204, the one or more removed plugs 116 can be inserted in the through-hole 109 to form a seal.

In some embodiments, the membrane 114 comprises a shaped pocket structure for receiving one or more components. For example, as shown in the circled section 112 in FIGS. 4 and 5, the membrane 114 includes a pocket 115 configured to receive the rim 56. In some embodiments, the pocket 115 is configured to receive the rim 56 and the washer 122. In some embodiments, the membrane 114 encloses the rim 56 and a washer 122 by contacting a lower surface of the washer 122, an upper surface of the rim 56, and the external edges of the washer and rim, as shown in FIG. 5.

In some embodiments, the washer 122 is configured to provide a seal between the upper and lower shells 50, 60. During use, the seal provided by the washer 122 prevents fire extinguishing materials in the compartment 202 from escaping into the compartment 204, and vice versa. In some embodiments, the washer 122 has a disk shape forming a generally flat upper surface and a generally flat lower surface, as well as an outer edge and an inner edge surrounding an aperture. In some embodiments, the washer 122 is circumferentially positioned around the fire extinguishing capsule 100 and circumferentially disposed between the upper and lower shells 50, 60. In some embodiments the upper surface of the washer 122 is in direct contact with a bottom surface of the rim 56. In some embodiments, the bottom surface of the washer 122 is further in direct contact with the pocket 115 of the membrane 114. In some embodiments, a majority of the surface area of the washer 122 is received within the pocket 115. In such embodiments, a minority of the surface area of the washer 122 is received within the groove 81 of the bladder 80, as shown in FIGS. 4 and 5. In such embodiments, the washer 122 therefore holds the bladder 80 in place.

In some embodiments, the washer 122 and/or the pocket 115 comprise a relatively weak portion 120 having a thinner section that is configured to break upon impact with an object (e.g., the ground). During use and upon hitting the ground, the weak portion 120 of the washer 122 and/or the pocket 115 breaks, the bladder 80 is released from the washer 122, and the bladder 80 is pushed into the upper shell 50.

In some embodiments, as shown in FIGS. 4 and 5, the pocket 115 of the membrane 114, the rim 56, and the washer 122 are coupled together with a fastener **123*a* through a fastener hole 123*b* configured for receiving the fastener 123*a*. Any suitable fastener can be used. For example, in some embodiments, the fastener 123*a* comprises a bolt and nut. Other fasteners are contemplated. In some embodiments, the fire extinguishing capsule 100 comprises a plurality of fastening holes 123*b* distributed around the circumferential rim 56. In some embodiments, an adhesive is used to further secure the pocket 115 to the rim 56 and/or the washer 122**.

In some embodiments, the fire extinguishing capsule 100 comprises a bladder 80 configured to contain a payload 110. The bladder 80 can be any suitable size and shape. In some embodiments, for example, the bladder 80 is sized based on the size of the upper shell 50. In some embodiments, the bladder 80 is sized to fit snugly into the compartment 202 defined by the upper shell 50, thereby being capable of displacing any liquid and/or gas contained therein.

In some embodiments, an upper surface of the bladder 80 is coupled to the plate 82 and to the rim 52 via the washer 122 inserted into the circumferential groove 81 formed on a side surface of the bladder 80. In some embodiments, the washer 122 is permanently coupled to the bladder 80. For example, in some embodiments, the washer 122 is adhered (glued) to the groove 81 to further enhance the seal between the upper and lower shells 50, 60 to therefore prevent leakage of any fire extinguishing materials relocating from the upper shell compartment to the lower shell compartment and vice versa.

The bladder 80 can be made out of any suitable material. In some embodiments, for example, the bladder 80 comprises a carbon-fiber material, which is capable of withstanding the weight and pressure involved when the fire extinguishing capsule 100 is deployed from, e.g., a high altitude position. The payload 110 can be any suitable material. For example, in some embodiments, the compartment 206 defined by the bladder 80 is filed with a foam. In some embodiments, the foam provides support for the bladder 80 upon impact of the fire extinguishing capsule 100 with a ground surface. In such embodiments, the foam filled bladder 80 allows the fire extinguishing capsule 100 to remain above the surface of the ground upon impact, rather than being forced into the earth where the distribution of fire extinguishing materials would have less impact on a fire.

In some embodiments, the bladder 80 in combination with the payload 110 enables the free fall of the fire extinguishing capsule 100 in a predetermined direction. For example, the bladder 80 in combination with the payload 110 can be a specific weight (e.g., a predetermined weight based on the volume of material enclosed) and the weight can be used to calculate the projected free fall.

In various embodiments, the fire extinguishing materials include water, water-based deterrent materials, and cryogenic substances. In some embodiments, the cryogenic substance is a liquefied gas, such as nitrogen ($N_2$), helium, or any other suitable gases. In some embodiments, both water-based deterrent and cryogenic substances are utilized in the fire extinguishing capsule 100. For example, a cryogenic material can be included in the volume of space 202 defined by the upper shell 50, and water or water-based materials can be included in the volume of space 204 defined by the payload 80 and lower shell 114. In some embodiments, the payload 110 in the bladder 80 comprises a fire extinguishing material.

In various embodiments, a fire extinguishing system is provided. In such embodiments, the system comprises one or more fire extinguishing capsules 100 and a container (e.g., a rack) for storing, transporting, and deploying the one or more fire extinguishing capsules 100. In some embodiments, the container comprises a rack and pulley. In such embodiments, each fire extinguishing capsule 100 of a plurality of fire extinguishing capsules 100 is positioned with its bottom surface 66 of the payload holder contacting the container's edges. During use (e.g., being deployed from an airplane), each capsule will slide down toward an end of the container and drop from the airplane toward a fire located below the airplane. Additionally, and/or alternatively, a fire extinguishing system comprising one or more fire extinguishing capsules 100 can be positioned and stocked in strategic location close to landscapes characterized as being at high risk of a wildfire. Accordingly, during a wildfire incident one or more fire extinguishing capsules 100 can be deployed with minimal response time. In some embodiments, the fire extinguishing system comprising one or more fire extinguishing capsules 100 can be stored without one or more fire extinguishing materials (unfilled), and then filled and deployed when needed.

In various embodiments, a method of extinguishing and/or suppressing a fire is provided. In such embodiments, the method includes providing a fire extinguishing capsule 100. Next, one or more compartments 202, 204, and 206 are filled with appropriate materials to provide an operative fire extinguishing capsule 100. For example, the first compartment 202 is filled with a cryogenic material (e.g., nitrogen), the second compartment 204 is filled with water, and the third compartment 206 is filled with a foam. In some embodiments, the method further comprises deploying the operative fire extinguishing capsule 100 in an area having a fire. For example, the deployment may include delivery of the capsule from an aircraft (e.g., airplane or helicopter) to a forest having an active wildfire. In such embodiments, the deployed operative fire extinguishing capsule 100 will be activated when it contacts the ground or a structure on the ground. In such embodiments, the activated fire extinguishing capsule 100 will release the fire extinguishing materials contained therein.

In some embodiments, the method of deploying the fire extinguishing capsule 100 will cause a plurality of plugs 106 to be ejected and cause one or more of the groves 113 on the membrane 114 to crack. More particularly, in such embodiments, the bladder 80 containing the payload 110 will be forced upward into the upper shell 50 upon impact of the fire extinguishing capsule 100 with the ground. In such embodiments, the assembly comprising the plate 82, the rods 108, and the plugs 106 will be displaced by the bladder 80, by force or pressure, therefore causing the plurality of plugs 106 to be ejected out of the upper shell 50. As a result, the nitrogen contained in the compartment 202 will be released via the through-holes 109 and the water contained in the compartment 204 will be splashed in the surrounding area.

In some embodiments, upon impact with the ground, the release of water and cryogenic fluids will cover the surrounding area with a thin layer of ice, which when evaporated, will reduce the heat and disperse oxygen away from the fire quickly. In some embodiments, the dispersion of fire extinguishing materials occurs in less than 5 minutes, or less than 1 minute, or less than 30 seconds, or less than 15 seconds, or less than 5 seconds. In some embodiments, the moisture in the area, which is higher than usual in a wildfire atmosphere, will condense and freeze to prevent the fire from reigniting and spreading. In some embodiments, when deployed from an aircraft during windy weather conditions, the firefighting efficiency of the fire extinguishing capsule 100 will increase because the wind assists with the evaporated cryogenic fluid spread in the direction of the wind and create a cold barrier on the way, thereby slowing and/or suppressing the spread of the fire.

One advantage of the fire extinguishing capsule 100 disclosed herein is its general lack of a negative environment impact. In particular, the fire extinguishing capsule 100 can utilize fire extinguishing materials, such as cryogenic fluids and water, that are environment friendly, and the remainder of the capsule materials after deployment may be collected and recycled. Another advantage of the fire extinguishing capsule 100 disclosed herein is the relatively low cost of implementation compared to existing methods. Thus, the fire extinguishing capsule 100 provides an efficient, environment friendly, safe and cost-effective firefighting device.

Another advantage of the fire extinguishing capsule 100 disclosed herein is its general safety profile during nighttime deployment. Planes can fly at a safe altitude and drop one or more of the capsules from safe altitude, even when targeting areas generally considered to be non-accessible. As a result, a fire department can respond to the fire during a dark night without assuming a substantial risk to the aircraft or personnel therein.

Many different embodiments have been disclosed herein, in connection with the above description and the drawings. It will be understood that it would be unduly repetitious and obfuscating to describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

An equivalent substitution of two or more elements can be made for any one of the elements in the claims below or that a single element can be substituted for two or more elements in a claim. Although elements can be described above as acting in certain combinations and even initially claimed as such, it is to be expressly understood that one or more elements from a claimed combination can in some cases be excised from the combination and that the claimed combination can be directed to a subcombination or variation of a subcombination.

It will be appreciated by persons skilled in the art that the present embodiment is not limited to what has been particularly shown and described hereinabove. A variety of modifications and variations are possible in light of the above teachings without departing from the following claims.

What is claimed is:

1. A fire extinguishing capsule, comprising:

an upper shell and a lower shell, each configured to form a closed receptacle when coupled to one another, wherein the upper shell comprises a valve, one or more through-holes, and a release system comprising: one or more removable plugs, each plug configured to fit into a through-hole of the one or more through-holes, an internal plate, and one or more rods coupling each of the one or more removable plugs to the internal plate;

wherein the lower shell comprises a membrane configured to contain a fire-extinguishing material; and a bladder coupled to the internal plate, the bladder further releasably coupled to the upper and lower shells, wherein the bladder is configured to remove the one or more removable plugs when released from the upper and lower shells.

2. The fire extinguishing capsule of claim 1, wherein the closed receptacle comprises a circular cross-sectional shape, wherein the upper shell comprises a hemispherical portion where the one or more through-holes are positioned and a cylindrical portion in contact with the hemispherical portion on a first edge and with a rim projecting from the upper shell on a second edge.

3. The fire extinguishing capsule of claim 2, further comprising a washer having an inner edge in contact with the bladder, the washer having a first surface and a second surface at a first spaced distance from the first surface, the first spaced distance defining a thickness of the washer, wherein the first surface is in contact with the rim of the upper shell.

4. The fire extinguishing capsule of claim 3, wherein the washer has a substantially flat disk structure comprising an outer circumferential edge having a first thickness and an inner circumferential edge having a second thickness, and wherein the second thickness is less than the first thickness.

5. The fire extinguishing capsule of claim 1, wherein the upper shell comprises a plurality of layers, including an outer layer having an external facing surface and an inner layer having an internal facing surface; and wherein the one or more through-holes passes through each of the inner and outer layers.

6. The fire extinguishing capsule of claim 5, wherein the outer and inner layers are separated by a second spaced distance that is optionally filled with an insulating material.

7. The fire extinguishing capsule of claim 5, wherein each plug of the one or more the plugs comprises a base that is retained by the internal facing surface of the inner layer, a stem extending through the through-hole from the base to the external facing surface of the outer layer, and a cap, wherein the each plug provides an air-tight seal of the through-hole.

8. The fire extinguishing capsule of claim 1, wherein the lower shell membrane comprises a pocket-structure configured to receive the rim of the upper shell and a portion of the washer.

9. The fire extinguishing capsule of claim 1, wherein the lower shell membrane comprises a plurality of grooves along an external surface thereof, and wherein each groove of the plurality of grooves is configured to create an opening in the membrane when activated.

10. The fire extinguishing capsule of claim 1, further comprising a valve cap configured to cover and protect the valve, the valve cap having a body and two or more flanges projecting from the body.

11. The fire extinguishing capsule of claim 1, wherein the membrane further comprises one or more removable plugs, each inserted into one or more membrane through-holes, wherein each of the one or more removeable plugs is positioned near a pocket to facilitate filling the membrane with the fire-extinguishing material.

12. The fire extinguishing capsule of claim 1, further comprising a fastener for coupling the pocket of the membrane, a rim, and a washer together.

13. The fire extinguishing capsule of claim 1, wherein the valve is configured to facilitate an impregnation of the upper shell with the fire extinguishing material and to adjust an internal pressure of the upper shell.

* * * * *